(12) United States Patent
Bhatt et al.

(10) Patent No.: US 8,595,344 B2
(45) Date of Patent: Nov. 26, 2013

(54) INTEGRATION MIDDLEWARE VIRTUALIZATION

(75) Inventors: Ankur Bhatt, Bangalore (IN); Christoph Liebig, Walldorf (DE); Frank Oliver Hoffmann, Walldorf (DE)

(73) Assignee: SAP AG, Walldorf (DE)

( * ) Notice: Subject to any disclaimer, the term of this patent is extended or adjusted under 35 U.S.C. 154(b) by 346 days.

(21) Appl. No.: 12/910,560

(22) Filed: Oct. 22, 2010

(65) Prior Publication Data

US 2012/0102171 A1    Apr. 26, 2012

(51) Int. Cl.
*G06F 15/173*    (2006.01)

(52) U.S. Cl.
USPC ............ 709/223; 709/226; 709/249; 719/313

(58) Field of Classification Search
USPC .......................... 709/223, 226; 719/249, 313
See application file for complete search history.

(56) References Cited

U.S. PATENT DOCUMENTS

| | | | |
|---|---|---|---|
| 6,467,052 B1 | 10/2002 | Kaler et al. | |
| 2006/0031540 A1 | 2/2006 | Purontaus et al. | |
| 2007/0255715 A1* | 11/2007 | Li et al. ........................... | 707/10 |
| 2009/0157872 A1* | 6/2009 | Pinkston et al. .............. | 709/224 |
| 2009/0165021 A1* | 6/2009 | Pinkston et al. .............. | 719/314 |
| 2009/0182595 A1 | 7/2009 | Milaski | |
| 2009/0235174 A1* | 9/2009 | Royt ............................. | 715/735 |
| 2010/0036751 A1* | 2/2010 | Eidt et al. ........................ | 705/27 |
| 2010/0049628 A1* | 2/2010 | Mannava et al. ................ | 705/27 |
| 2010/0302248 A1 | 12/2010 | Houghtlin et al. | |

FOREIGN PATENT DOCUMENTS

WO    2004/081827    9/2004

OTHER PUBLICATIONS

'Hypergraph' [online]. Wikipedia, 2008, [retrieved on Oct. 7, 2010]. Retrieved from the Internet: <URL: web.archive.org/web/20080415090010/http:/en.wikipedia.org/wiki/Hypergraph>, 4 pages.
'Metamodeling' [online]. Wikipedia, 2007, [retrieved on Oct. 7, 2010]. Retrieved from the Internet: <URL: web.archive.org/web/20071214003316/http:/en.wikipedia.org/wiki/Metamodeling>, 9 pages.
'Business Process Modeling Notation' [online] Wikipedia, 2007, [retrieved on Oct. 7, 2010]. Retrieved from the Internet: <URL: web.archive.org/web/20071018142021/http:/en.wikipedia.org/wiki/BPMN>, 7 pages.
'BPMN 2.0 Metamodel Implementation for Eclipse: Get it and Use it' [online]. SAP, 2010, [retrieved on Oct. 7, 2010]. Retrieved on the Internet: <URL:www.sdn.sap.com/irj/scn/go/portal/prtroot/docs/library/uuid/c04f0691-0a76-2d10-1098-ec518f7bdf68?QuickLink=index&overridelayout=true>, 13 pages.

(Continued)

*Primary Examiner* — Liangche A Wang
*Assistant Examiner* — Cheikh Ndiaye
(74) *Attorney, Agent, or Firm* — Fish & Richardson P.C.

(57) ABSTRACT

A computer-implemented method includes displaying virtualization level options for a business network to a user, the virtualization level options including at least: a first virtualization level option that includes externalizing interaction logic in the business network, a second virtualization level option that includes virtualizing content in the business network, and a third virtualization level option that includes virtualizing components in the business network. The method includes receiving a selection by the user of at least one of the virtualization level options. The method includes initiating a virtualization process in the business network according to the selected virtualization level option.

21 Claims, 9 Drawing Sheets

(56) References Cited

OTHER PUBLICATIONS

'Modeling Your First Process with SAP NetWeaver Business Process Management' [online] SAP AG, 2009, [retrieved on Oct. 7, 2010]. Retrieved from the Internet: <URL: http://www.sdn.sap.com/irj/scn/go/portal/prtroot/docs/library/uuid/c052052e-fbab-2b10-0d9a-9feed5463589?QuickLink=index&overridelayout=true>, 66 pages.

OMG, "Business Process Model and Notation (BPMN), Version 2.0" *Object Management Group*, 2010, pp. 1-550.

'BPMN to BPEL case study solution in VIATRA2' [online] Bergmann and Horvath, 2009, [retrieved on Oct. 7, 2010]. Retrieved from the Internet: <URL: http://is.tm.tue.nl/staff/pvgorp/events/grabats2009/submissions/grabats2009_submission_21.pdf>, 5 pages.

SAP AG, "SAP NetWeaver Business Process Management: Create and Adapt Business Processes Fast and Flexibly," *SAP Solution Brief*, 2008, 4 pages.

OMG, "Business Process Model and Notation (BPMN), Version 1.2," *Object Management Group*, 2009, pp. 1-316.

European Search Report & Written Opinion for Application No. EP 11007406, dated Nov. 22, 2011, 9 pages.

Jay J: "ActiveWin: Microsoft Vision 2000 Professional—Review", Internet Citation, Oct. 27, 2000, XP002351329, Retrieved from the Internet: URL: http://www.activewin.com/reviews/software/apps/ms/visio2k/index.shtml [retrieved on Oct. 26, 2005].

Tim Anderson: "Microsoft Visio 2002", Personal Computer World, London, GB, Jun. 28, 2001, pp. 1-4, XP002422569.

Tim Anderson: "Microsoft Visio 2003", Personal Computer World, London, GB, Sep. 18, 2002 (Sep. 18, 2003), pp. 1-2, XP002422570.

\* cited by examiner

INTEGRATION MIDDLEWARE VIRTUALIZATION

TECHNICAL FIELD

This document relates to integration middleware virtualization.

BACKGROUND

Business networks occur in many aspects of commerce. Each business network includes a set of participants, such as people, organizations, companies, who collaborate in various ways to conduct business. For example, the business involves manufacturing, storing, distributing or servicing goods, or delivering a product or service to a customer. Many of such participants have implemented enterprise resource planning (ERP) systems and other application systems for these purposes, to support their internal processes. For example, cross-organizational activities related to service delivered by the business network can interface with (or run within) application systems of one or more participants. Some business network participants may use additional information systems and information technology (IT) based process orchestrations to deliver the service.

Business processes running end-to-end in a business network are executed on local systems of various participants. Today, participants who wish to enable end-to-end business network operations and provide visibility into business network performance, may need to implement costly, risky and time consuming projects to deliver process integration into local applications. In the context of business networks, this business-IT dilemma may be exaggerated by a disconnect within or between participating organizations between, on the one hand, their individual IT situation, and on the other, their business language. The cost and complexity is further multiplied by the number of participants who must collaborate in a business network to achieve a common goal. This number ranges from fifty (at the low end) to many hundred in some enterprise settings. For each participant, the integration, operation and visibility needs to be addressed case-by-case, covering the end-to-end flow of business information and values, from activities within the private domain of one participant (e.g., the solicitation of a quote) to the partner's corresponding business activities (e.g., the confirmation of an order) and follow-up activities by related participants (e.g., production orders, shipping advice, etc.). Each partner-to-partner collaboration in the network needs to be implemented against autonomously designed information systems and integration technologies.

Generally, bringing information system support to a business network requires that mutual knowledge be acquired about the global view of the business network, or in a sense, of the network fabric. Most often, the required knowledge for such an integration is distributed over multiple or even many people in the organization. Typically, no single person has an end-to-end understanding of the business processes, organizations and IT landscape of their own organization, let alone those of all the involved participants. This lack of knowledge and the disconnect between participants (and their business and IT organizations) hinders the effective delivery of information system support for the collaborative business activities and business network lifecycle events. For example, effective support requires managing the evolution of the information system and business process operations, such as: on- or off-boarding participants, modifying process steps or information exchange, creating process variants due to regional or contractual variations, changing contracts regarding business rules and service level agreements (SLAs), ensuring continuous operations, and performing business optimization.

One class of participants in business networks are the so-called mediation participants, which are systems that run different types of integration middleware, often from different vendors. Integration middleware is computer software that connects software components or applications, and generally includes a set of services for multiple processes on one or more machines to interact across a network. For example, integration middleware is sometimes said to:

Enable application-to-application (A2A) integration, business-to-business (B2B) integration and electronic data interchange (EDI);

Allow applications to implement service oriented architecture (SOA) and event driven architecture (EDA) principles; and Manage and orchestrate business processes across applications.

A typical customer landscape can have multiple instances of software components deployed and running that perform the tasks outlined above. These software components are either deployed as a central hub (e.g., as a standalone system or closer to the application, such as embedded within the application system). The network created by integrating all such systems and applications via these software components allows companies to run their day-to-day business.

The heterogeneousness of the used integration middlewares impedes a consistent end-to-end design, configuration and operation. Instead, customers will sometimes use different tooling to model and configure the end-to-end communication scenario. Also, various operation tools, such as monitoring, alerting, or reporting tools, may be inconsistent or incompatible with each other. These and other circumstances with integration middleware can impact key aspects of a business:

1. Total cost of ownership (TCO).
2. Ability to optimize the business network landscape.
3. Transparency for performing and monitoring end-to-end operations.
4. Ability to extend or add new integration scenarios. For example, integration between two applications is sometimes spread across multiple integration middlewares.
5. Ability to connect integration with business process definitions.
6. Ability for people responsible for different integration middlewares to communicate with each other.

SUMMARY

This document describes examples of integration middleware virtualization. As described below, one or more of multiple approaches can be followed to achieve virtualization of the integration middleware in a business network. The approaches can differ from each other in their relative invasiveness with regard to the business network. For example, some approaches externalizing interaction logic whereas others actually virtualize network components.

In some implementations, integration middleware virtualization defines architecture patterns, leveraging the virtualization concepts applied successfully in network, database and application domains. This can provide more efficient business network management. As such, integration middleware virtualization aims for holistic solutions working across different integration components in the Network, while remaining compatible with existing integration middleware products.

The following are examples of five patterns that can be used in virtualizing integration middleware. A first pattern involves discovering and documenting the business network by retrieving at least design time metadata, configuration and runtime metadata, and operation data. A second pattern discovers and documents the business network, and also obtains an integration model from the integration middleware using runtime entities that monitor and capture additional information about the execution of integration scenarios. A third pattern encapsulates the specific meta models for integration middleware into an integration specification that represents interaction across specific integration models in different integration middlewares, and tracks the flow across the integration content in local runtimes using a runtime mediator. A fourth pattern defines a generic model for integration content across integration middlewares, and transforms the generic model into a specific runtime metadata and configuration for particular integration middleware. A fifth pattern extends the generic model for integration content and introduces a runtime component "container" that works within or side-by-side with integration middleware. The runtime component interprets the generic model for integration content and conveys it into the specific integration middleware.

In a first aspect, a computer-implemented method includes: selecting in a computer system at least one virtualization level option for a business network from among at least: a first virtualization level option that includes externalizing interaction logic in the business network, a second virtualization level option that includes virtualizing content in the business network, and a third virtualization level option that includes virtualizing components in the business network; performing the selected virtualization level option using the computer system; and recording at least one result in the computer system from performing the selected virtualization level option.

Implementations can include any or all of the following features. The first virtualization level option is selected, and wherein performing the first virtualization level option comprises: retrieving at least design time metadata, configuration metadata, runtime metadata and operation data for integration middleware in nodes of the business network; and generating a business network documentation based on at least retrieved metadata. At least business process models, solution blueprints, application metadata, and business data are also retrieved. The first virtualization level option is selected, and wherein performing the first virtualization level option comprises: initiating a runtime entity that retrieves specific integration models from respective integration middlewares in nodes of the business network; and generating a business network documentation based on at least the retrieved integration model.

The second virtualization level option is selected, and wherein performing the second virtualization level option comprises: initiating at least one runtime entity that retrieves specific integration models from respective integration middlewares in nodes of the business network; receiving user input specifying business characteristics and technical characteristics of the business network; and generating an integration specification based on at least the retrieved integration model, the integration specification representing interaction across the specific integration models. The method further includes: initiating a runtime mediator that tracks message flows between nodes of the business network; and generating a business network documentation based on at least the retrieved specific integration models and the tracked message flows.

The third virtualization level option is selected, and wherein performing the third virtualization level option comprises: initiating a runtime entity that retrieves an specific integration models from respective integration middlewares in nodes of the business network; initiating a runtime mediator that tracks message flows between nodes of the business network; and generating a generic model based on at least the retrieved integration model and the tracked message flows. The method further comprises: generating, using the generic model and for a specific component of the integration middleware, at least runtime metadata and configuration data; and providing the runtime metadata and the configuration data to the specific component of the integration middleware. The method further comprises: initiating a flow interpreter that interprets the generic model and provides necessary input to the specific component of the integration middleware. The method further comprises: displaying the virtualization level options to a user of the computer system; and receiving a user input indicating at least one of the displayed virtualization level options to be selected.

In a second aspect, a computer program product tangibly embodied in a computer readable storage device includes instructions that when executed cause a processor to perform a method comprising: displaying virtualization level options for a business network to a user, the virtualization level options including at least: a first virtualization level option that includes externalizing interaction logic in the business network, a second virtualization level option that includes virtualizing content in the business network, and a third virtualization level option that includes virtualizing components in the business network; receiving a selection by the user of at least one of the virtualization level options; and initiating a virtualization process in the business network according to the selected virtualization level option.

In a third aspect, a system includes: computer devices connected with each other to form a business network; and a virtualization module tangibly embodied in a computer readable storage device, the virtualization module configured to display virtualization level options for the business network to a user, the virtualization level options including at least: a first virtualization level option that includes externalizing interaction logic in the business network, a second virtualization level option that includes virtualizing content in the business network, and a third virtualization level option that includes virtualizing components in the business network.

Implementations can include any or all of the following features. At least part of the virtualization module is implemented as a cloud service for the business network. The system further includes: a runtime entity that after the user selects the second virtualization level option retrieves specific integration models from integration middlewares in at least some of the computer devices; an input control for a user specify business characteristics and technical characteristics of the business network; and an integration specification that the virtualization module generates based on at least the retrieved integration model, the integration specification representing interaction across the specific integration models. At least the integration specification is generated as a cloud service for the business network. The system further includes: a runtime mediator that tracks message flows between at least some of the computer devices; and a business network documentation that the virtualization module generates based on at least the retrieved integration model and the tracked message flows.

The user selects the third virtualization level option, and the system further comprises: a runtime entity that after the user selects the second virtualization level option retrieves an integration model from integration middleware in at least some of the computer devices; a runtime mediator that tracks message flows between at least some of the computer devices; and a generic model that the virtualization module generates based on at least the retrieved integration model and the tracked message flows. At least the generic model is generated as a cloud service for the business network. The system further comprises: runtime metadata and configuration data that the virtualization module generates for a specific component of the integration middleware using the generic model, and provides to the specific component of the integration middleware. The system further comprises: a flow interpreter that interprets the generic model and provides necessary input to the specific component of the integration middleware.

Implementations can provide any or all of the following advantages. Provide transparency in a business network allowing both technical and business operations. Track business process and integration across the business network. Manage alerts and handle exceptions as they occur on the business network. Managing changes to the business network, such as with removals and enhancements, etc. Use business process models and blueprints as a basis to develop and implement new integration between business applications. Ensure enforcement of SLAs and policies for integration within the business network. Provide ability to simulate and perform a "what-if" analysis based on an existing state of the business network and business process blueprints. Provide efficient utilization, manageability and regulatory compliance via security, quality of service, and traffic path manipulation. Increase flexibility to customers by virtualization of databases needed for tables, indices, queries, etc. Improving portability and manageability of applications, and increasing their compatibility with the operating system. Aid development and implementation of components. Providing core capabilities for managing heterogeneity.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1A:
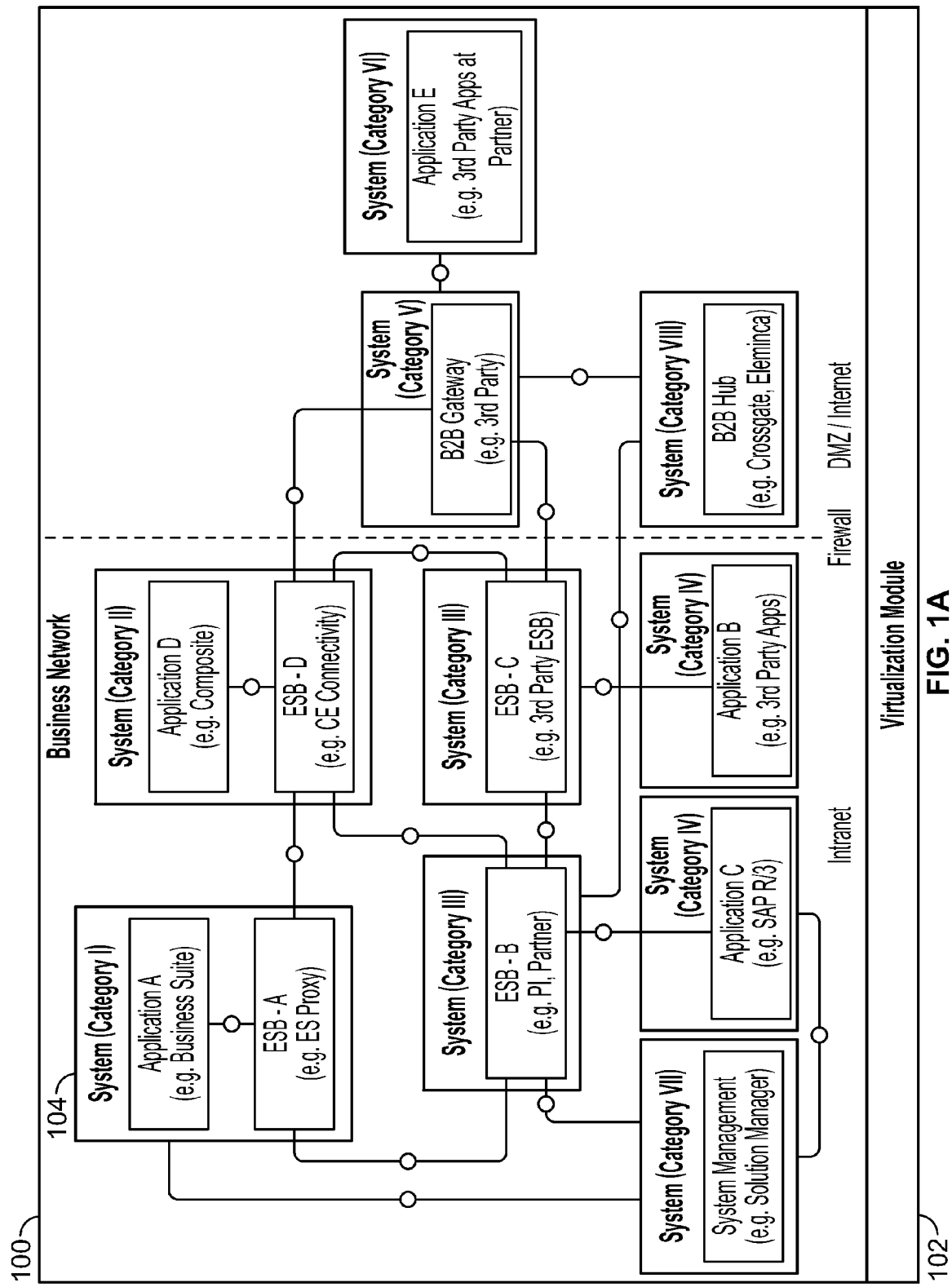
FIGS. 1A-B are block diagrams showing discovery and operation of a business network across integration components.
Figure 1B:
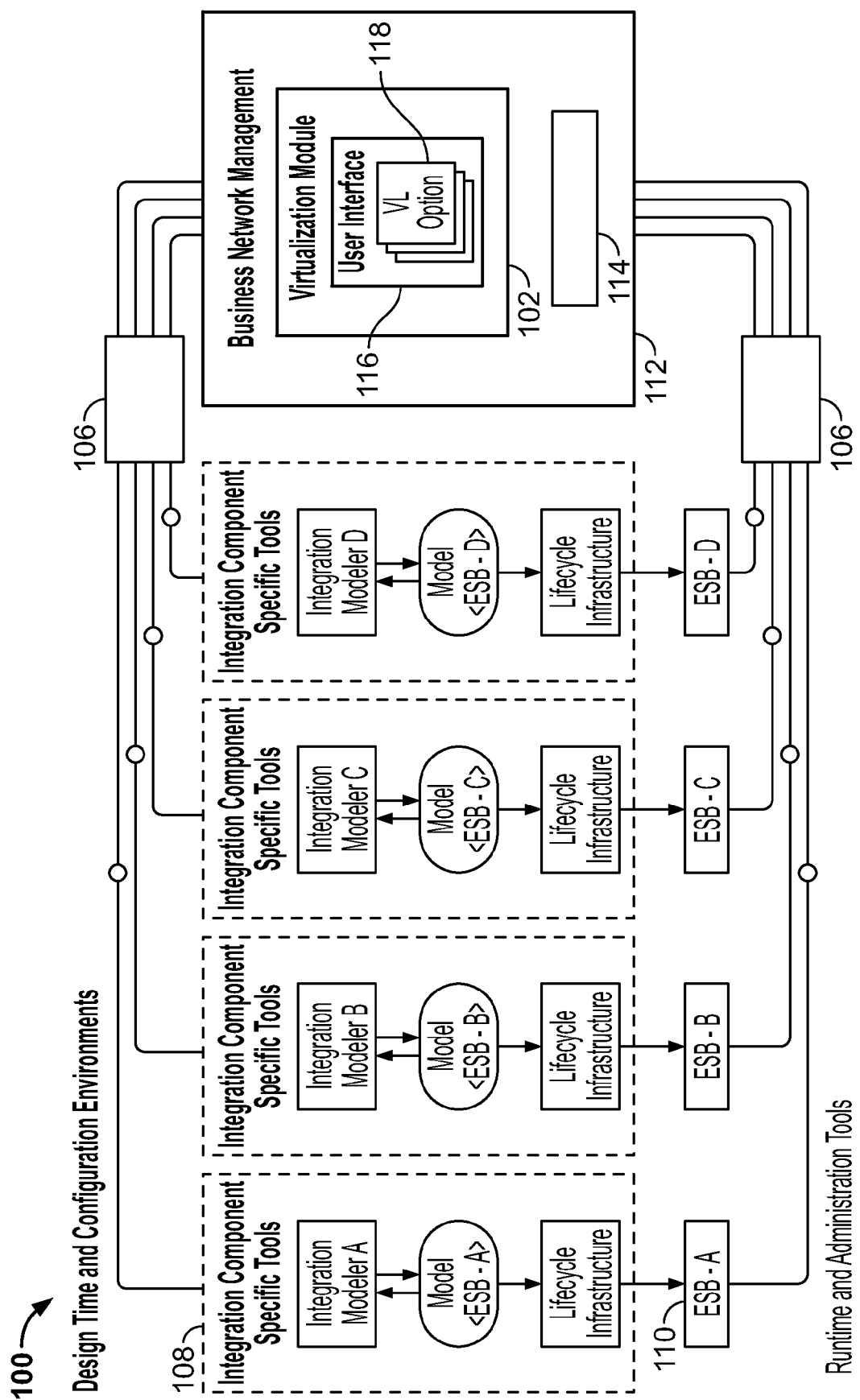

FIGS. 1A-B are block diagrams showing discovery and operation of a business network 100 across integration components. As an introduction to integration middleware virtualization patterns, the following description provides a view on integration components commonly found in business networks at customer landscapes. The network for a large enterprise often consists of a network of applications and integration components for in-house internal processes, plus a network of applications and integration components for external processes interacting with business partners, such as suppliers, transport carriers, dealers, etc. In such a landscape, the systems can be classified into different categories to illustrate the heterogeneous nature of the network based on the integration content and the role a system plays in integration within the landscape. This classification provides guidance and helps in deciding the implementation strategy based on architecture patterns of integration middleware virtualization.

A virtualization module 102 can be applied to all or part of the business network 102. The virtualization module can be implemented locally, regionally, or as a cloud service available to the business network, to name a few examples. In some implementations, the virtualization module can perform functions including business network discovery, model creation based on discovered artifacts, and virtualization using the created model(s). For example, a technical view of the business network 102 with classifications of systems 104 can use the following categories:

Category I—Applications with an integration proxy and connectivity (e.g., a business suite with enterprise services/IDocs) represented as Application A+ESB A.

Category II—Applications with integration proxies, connectivity plus mediation (e.g., a business suite with enterprise services/IDocs, composite applications with service adaptation) represented as Application D+ESB D.

Category III—Standalone ESB or integration server (e.g., process integration or third-party ESB) represented as ESB B+ESB C.

Category IV—Applications connecting to standalone ESB or integration server (e.g. R/3 4.6C with BAPIs, third-party applications) represented as Application B+Application C.

Category V—B2B gateways (e.g. PI adapter engine or third-party ESB) represented as B2B gateway.

Category VI—Applications connecting to B2B gateways running at business partners of a company (e.g. third-party applications) represented as Application E.

Category VII—System management solutions that operate systems, software and their lifecycle (e.g., solution manager, IBM Tivoli, Microsoft SMS, HP Open View, etc.) and SOA management solutions (e.g., Amber Point, Progress Actional etc.) that manage services in a customer landscape, represented as System Management.

Category VIII—B2B hubs or marketplace, both industry specific, such as Eleminca, and cross industry B2B infrastructure providers, such as Crossgate, represented as B2B Hub.

Some examples herein will be described in terms of virtualization patterns, where the different patterns vary from each other in how invasively they canvas the business network, and the degree to which their respective resulting virtualizations are complete, consistent, and coherent.

Pattern 1 involves discovering and documenting the business network 100, and operating the business network. In some implementations, Pattern 1 aims at providing administration and operational efficiency for the integration network. To work across the different integration components, this pattern for integration middleware virtualization provides discovery of the network across the different category systems 104 to perform operations across them. The discovery of the network is based on exploration and retrieval of content about: systems and applications; design time models; configuration meta data; runtime metadata; monitoring data; issue resolution information; business data, such as master data or transactional data, master data, such as contacts, products, and distribution centers; transactional data, such as sales orders, delivery orders, etc.; and application settings, customizing and configurations, to name a few examples. The information is retrieved for all integration components in the network but the type of information and degree of detail will vary depending on the category of systems and openness of specific integration components.

Using Pattern 1, the retrieved information may not directly provide the network view due to inconsistencies, incoherence and incompleteness. The retrieved content may be incomplete in terms of directly providing information for a network view. For example, a communication or message flow between two systems in the business network cannot be derived by looking at only one system.

Also, the retrieved content may be inconsistent as same information will have multiple representations within one data source and multiple formats across different data sources. Such inconsistency leads to lack of clarity and inability to use the information for a network view.

Finally, the content retrieved across integration and application systems may be incoherent as the atomic nature information within individual systems does not provide the end-to-end perspective of integration. Even for simple exchange of business data between two applications, message flows across multiple embedded and stand-alone integration components, leading to appearance of unconnected applications. Such derivations are not possible by analysis of only one data source but require the analysis to cross boundaries between different data sources.

In Pattern 1, analysis and consolidation of discovered content is performed to create a view of the business network. Since the integration components are basically responsible for the communication between applications, discovering and further analysis will result in sufficiently detailed and accurate view of the actual physical network. Information gathered in network discovery is collected in the virtualization module 102. In some implementations, a general business network management component 112 can include the virtualization module 102 and an integration network operations module 114. In some implementations, the virtualization module 102 can generate a user interface 116 that can present virtualization level (VL) options 118 for the business network 100 to a user. For example, Pattern 1 can correspond to a first virtualization level option that includes externalizing interaction logic in the business network 102. When at least one of the virtualization level options 118 is selected, the virtualization module 102 initiates the corresponding virtualization process. In other implementations, virtualization level selection is performed automatically, such as based on one or more predefined criteria. For example, the virtualization level options 118 may then not be shown in the user interface, but rather the system chooses between them internally.

In some implementations, according to at least one of the virtualization level options 118 (whether selected by a user or automatically), the virtualization module 102 retrieves at least design time metadata, configuration metadata, runtime metadata and operation data for integration middleware in nodes of the business network 100. Other examples of information that can be retrieved include, but are not limited to, the following: business process models, solution blueprints, application metadata, and business data. For example, existing databases, repositories, knowledge banks, documentation and transactional data can be accessed for the retrieval. In some implementations, customized processes can be created to perform directed searches for the data or metadata, for example using mappings that identify the relevant information repositories and/or information types. As another example, business network experts or other users can be prompted to submit or identify relevant data or metadata from their respective domains of the business network. Based on at least the retrieved metadata, the virtualization module 102 generates a business network documentation. For example, the documentation is generated based on analysis and consolidation of the metadata, and can be printed or displayed.

Figure 2:
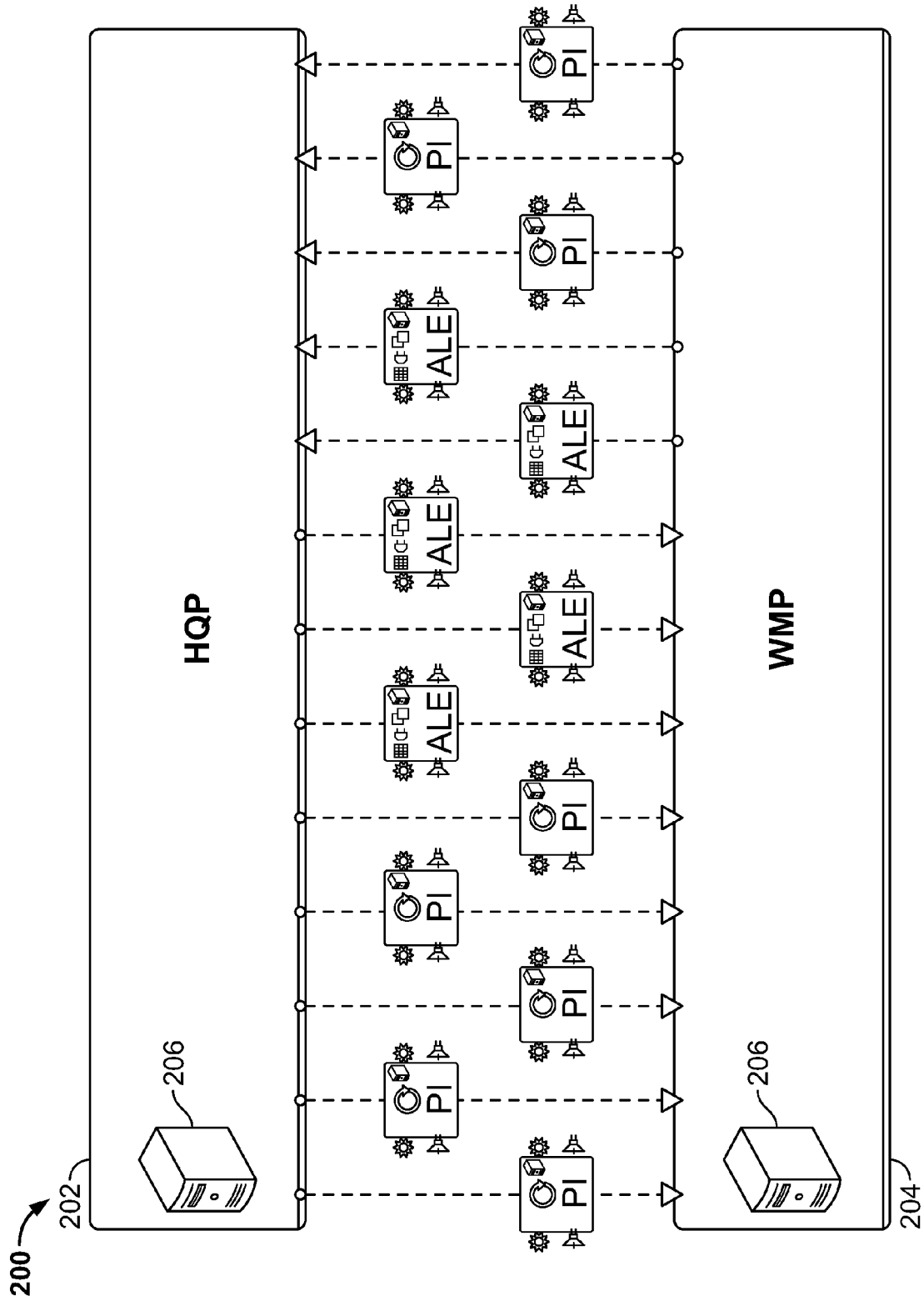
FIG. 2 is a block diagram showing a view of a business network.

Once the business network 102 has been discovered and consolidated, a network view can be generated that provides a single administrative entity for IT administrators. FIG. 2 is a block diagram showing a view 200 of a business network. The view 200 is generated based on virtualized integration middleware and other discovered knowledge about the business network. For example, the integration middleware virtualization involves abstracting a concrete integration middleware implementation to common parts on which further operations (such as displaying) are defined.

The view 200 shows a process 202 interacting with a process 204. Here, the process 202 is performed at a headquarter system (HQ) and the process 204 is performed at a warehouse management system (WM). For example, each of the processes 202 and 204 can be implemented for execution on one or more computer devices 206, such as servers. Arrows between the processes 202 and 204 represent message flows, such as exchange of information in form of electronic messages or otherwise. The message flows illustrated here can be considered mediation flows, in that the messages are mediated by integration middleware components. The view 200 can be displayed to the user, for example in the user interface 116 (FIG. 1A). In some implementations, the view 200 is generated in the user interface based on automatically triggered virtualization and automatic selection of the virtualization level(s).

In some situations, a unified view can be generated irrespective of the underlying application and integration components. In some implementations, the view 200 is editable, allowing for documentation and definition of concrete facts about systems, applications and integration content as running in the production landscape.

In some implementations, the view 200 provides tracking of relevant alerts in the business network, and can display related monitoring information. For example, the alerts of interest can be specified in the virtualization module 102 (FIG. 1) and upon the alert being generated, the view 200 can be updated accordingly.

The view 200 can provide navigation. In some implementations, the view 200 can provide the user with a navigation tool to access the HQP process 204 and/or the WMP process 206. For example, to resolve any issues detected in discovering the network, the IT administrators can navigate to the tools 108 (FIG. 1B) for the specific integration components. The navigation is based on the issue resolution information retrieved at the time of discovery. The network view offers the starting point for getting an overview of the incident on the network before drilling down to the specific detail. This will create transparency in the interactions and flow of information across processes spanning multiple system boundaries.

The changes to the business network are tracked only after implementation in application and integration middleware. In some implementations, discovery and consolidation is a continuous process performed at regular intervals. For example, this can ensure that removals, additions, or modifications within the business network are automatically reflected in the network view.

Pattern 2 extends Pattern 1 and involves enriching the business and technical view of the business network, and operating the business network. In some implementations, Pattern 2 aims to bring the business perspective to the integration network for increased transparency and visibility.

Network nodes can automatically discover each other and, using explicit definition in network administration tools, create single software-based administrative entities. In some implementations, content discovery components 106 (FIG. 1B), such as runtime software-based agents or proxies released by customers, can automatically crawl or scan through the business network and its available information. For example, the content discovery components 106 can target information in design time and configuration environments, such as tools 108 specific to the integration component, and information on runtime and administrative environments, such as tools 110 for enterprise services. Business data, for example master and transactional datasets, is also retrieved to be consolidated with technical information about the business network. Based on at least the retrieved metadata, the virtualization module 102 generates a business network documentation, such as the view 200.

Figure 3:
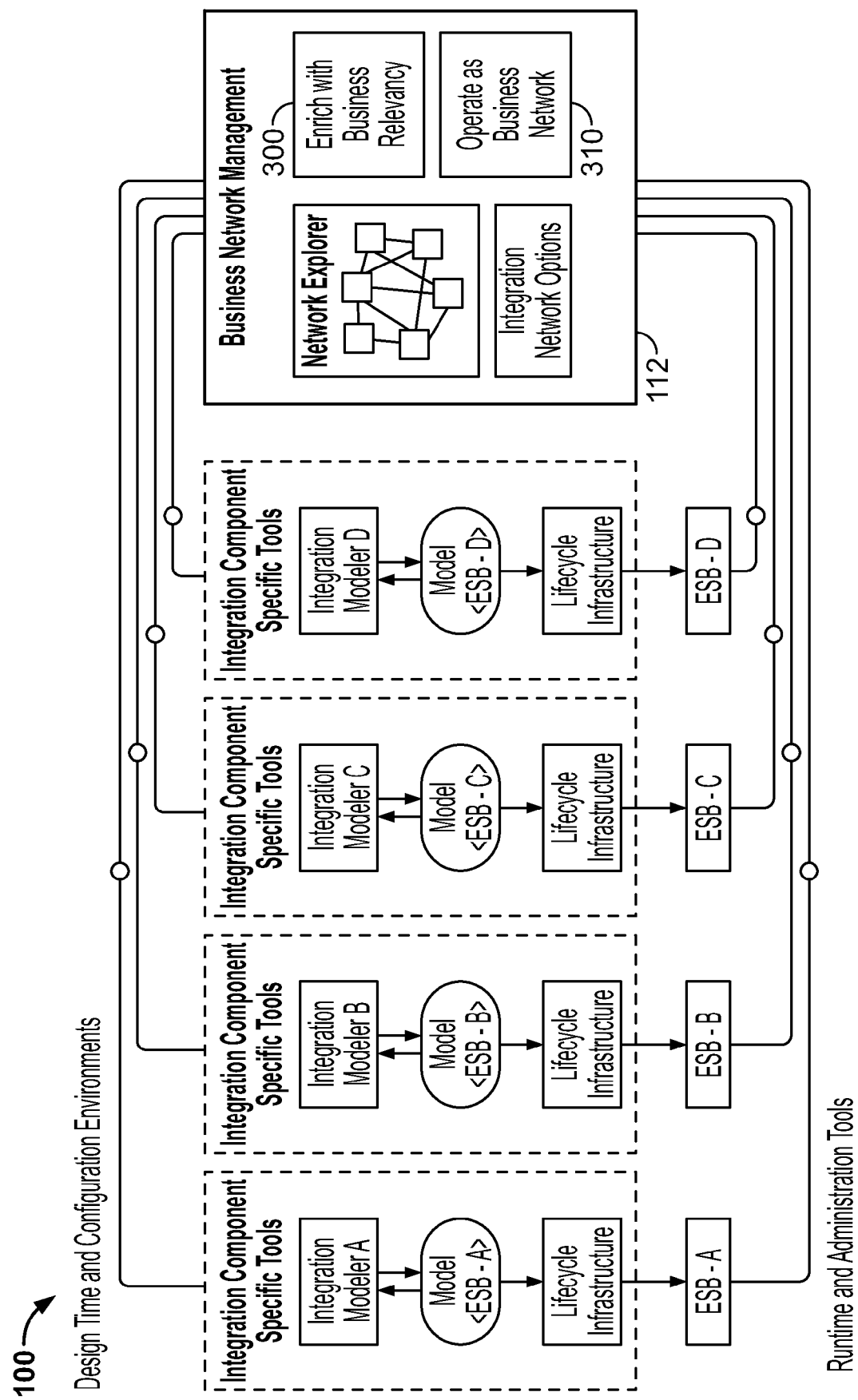
FIG. 3 is a block diagram showing enrichment of the technical view of the business network.

FIG. 3 is a block diagram showing enrichment of the technical view of the business network 100. The business network management module 112 here includes an enrichment module 300. In some implementations, a user can enrich the view of the business network with business semantics, including, but not limited to, information about business entities and models. Such enrichment can augment the information available in the view 200 (FIG. 2). For example, the network view can allow IT administrators as well as business users to track the communications between applications by monitoring the different integration components in the business network from both business and technical perspectives.

Integration middleware operation can be enhanced by correlating business relevant information with technical integration. In some implementations, this allows for business operations to be performed within the discovered business network across various integration middleware components. For example, an "Operate as business network" module 310 can allow business-network functions and operations to be performed, analogous to a simulation, and the results can be captured and presented. Accordingly, business users can manage the business impact of incidents arising in the network and collaborate with IT staff when required.

As in Pattern 1, new integration developments implemented within the respective integration middleware components and other changes in the business network can be discovered and made available in the view 200. Patterns 1 and 2 here correspond to one of the virtualization level options 118 (FIG. 1B), whether selected by a user or automatically, that includes externalizing interaction logic in the business network.

Figure 4:
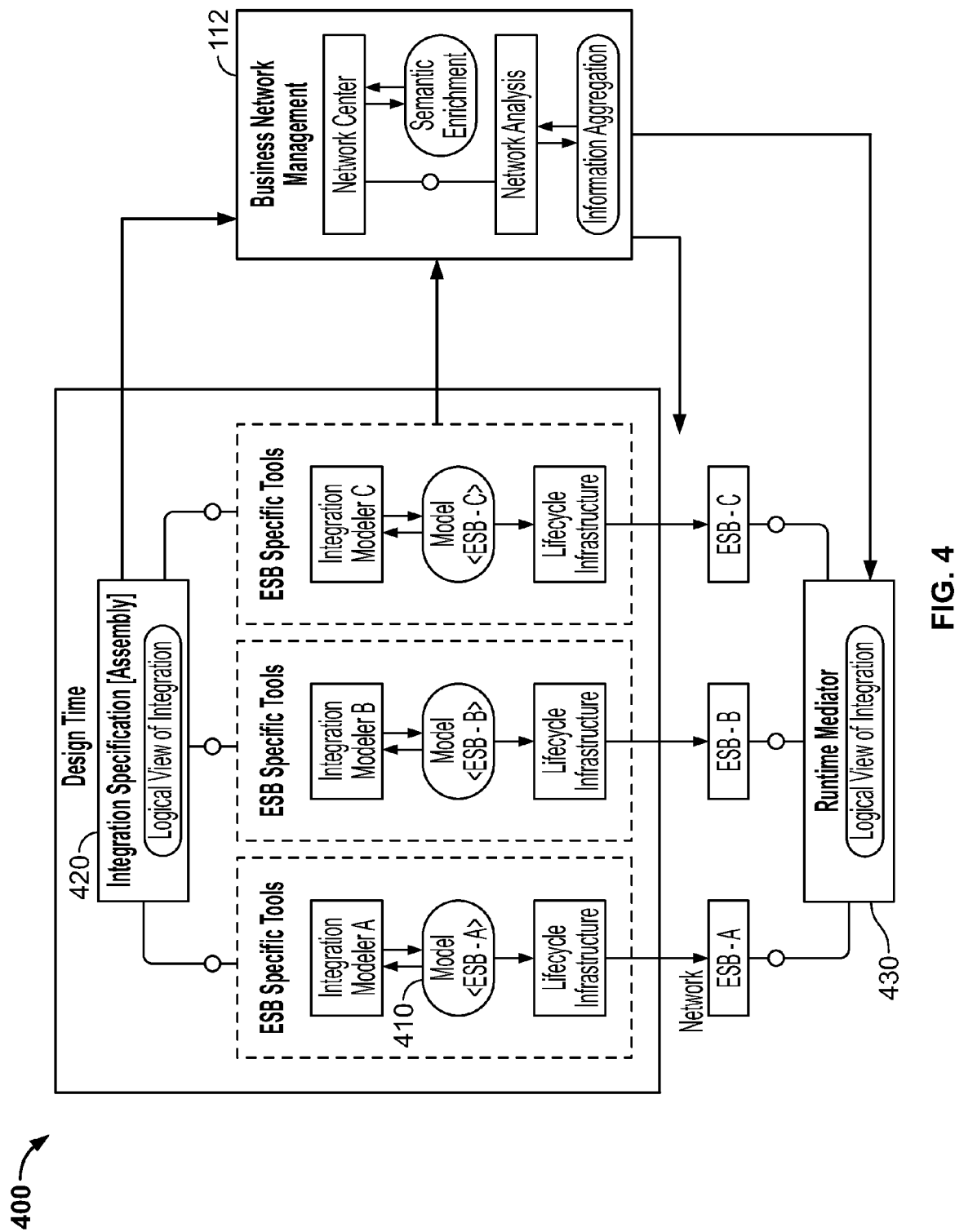
FIG. 4 is a block diagram showing an architecture for virtualization with mediation.

Pattern 3 involves encapsulating and implementing integration content, and mediating the runtimes. FIG. 4 is a block diagram showing an architecture 400 for virtualization with mediation. The architecture 400 can be used for virtualization according to Pattern 3.

In some implementations, Pattern 3 focuses on the problem of new integration developments based on an already discovered and documented integration network. This pattern encapsulates the meta models 410 that are specific to integration middleware into one integration specification 420. The integration specification model is created by architects and business experts based on process blueprints describing the to-be models and solution maps for functional scope. The integration specification model bridges the business perspective with technical implementation. The integration specification is defined and generated to represent interaction across the meta models 410 and defines the baseline for components and integration between the components to be developed to extend the business network. The implementation is still done in the integration middleware specific tooling, but the integration specification feeds into the specific models. The integration specification model defines the wire-frame for the specific developments to be done in integration middleware specific tooling. Each of the parts of integration specification model relevant for a particular integration middleware are generated or copied or transferred as integration middleware specific models. In some implementations, a tool for creating the integration specification 420 is generated as a cloud service for the business network.

Here, a runtime mediator 430 is introduced, which uses the integration specification 420 to act as intermediary between the integration middleware components. The runtime mediator 430 can be distributed or centralized. For example, the runtime mediator 430 tracks the flow across the specific integration content executed in local runtimes.

Figure 5:
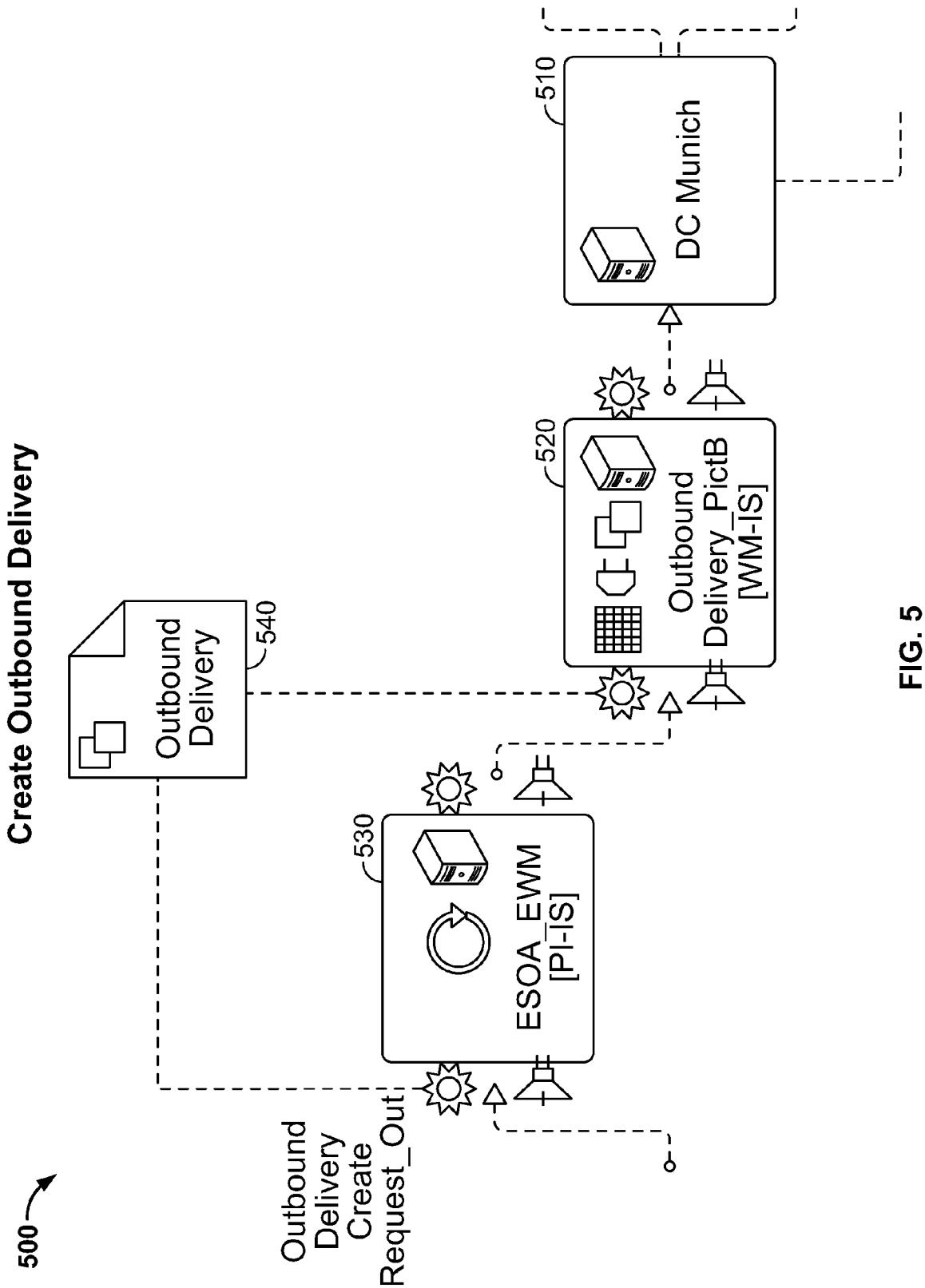
FIG. 5 is a block diagram showing encapsulation of a business model.

In some implementations, the runtime mediator 430 can track message flows between nodes of the business network, and a business network documentation can be generated based on at least the retrieved integration model and the tracked message flows. FIG. 5 is a block diagram showing an encapsulation 500 of a business model. Here, the encapsulation 500 reflects that a business network participant 510 (e.g., the Munich distribution center (DC)), is configured to be receiving one or more messages 520 (e.g., an electronic document here called "Outbound Delivery_PictB". For example, the message 520 can be received from a warehouse management system, and the message is therefore labeled "WM-IS". The warehouse management system, moreover, may have generated the message 520 based on one or more messages 530 received from another participant. For example, the message 530 can be received from a process integration system, and is therefore labeled "PI-IS". Based on this discovered information, the virtualization module can create an outbound delivery document 540 that encapsulates at least part of the flow for the corresponding portion of the business network.

Referring again to FIG. 4, the runtime mediator 430 facilitates enforcement of the integration specification model thus allowing policies and service level agreements across the integration middleware components, and control of operations across multiple integration middleware components. As a result, newly introduced integration developments can be controlled via the business network management module 112, and specific integration middleware tools will be called in case of specific models. As another example, Pattern 3 makes possible enforcement and operations control of all newly developed integration across multiple integration middleware components. Accordingly, Pattern 3 is an example of one of the virtualization level options 118 (FIG. 1B), whether selected by a user or automatically, that includes virtualizing content in the business network 100.

Figure 6:
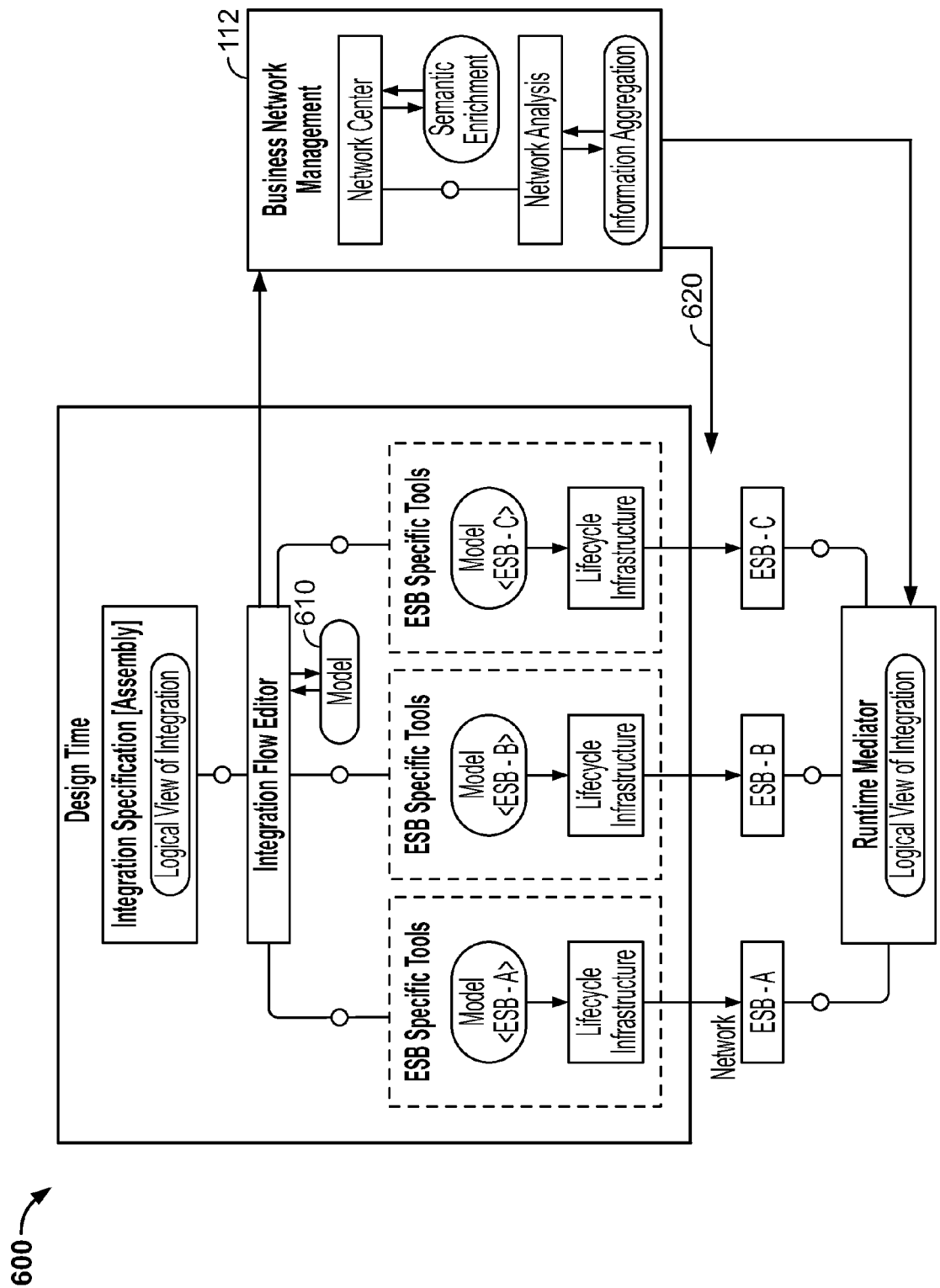
FIG. 6 is a block diagram showing an architecture for virtualization with mediation and enrichment.

Pattern 4 involves encapsulating and implementing integration content, and generating it to runtime engines. FIG. 6 is a block diagram showing an architecture 600 for virtualization with mediation and enrichment. This pattern encapsulates the integration content and then allows definition of a generic model 610 for integration content across the integration middleware components.

The generic model is modeled for new integration content for a particular integration middleware and is then transformed into specific runtime metadata and configuration for a particular integration middleware. For example, arrow 620 here illustrates the generated content provided to the runtime (s). The generic model can be modeled as a cloud service for the business network.

In some implementations, the generic model 610 is executed on existing integration middleware runtime(s). The encapsulation of content defines the interaction across integration middleware and application systems. With the generic integration flow model, the execution of integration content on a particular runtime integration middleware is controlled from outside, as an example of further virtualization. As a result, new integration scenarios can be developed from the business network management module 112, without tooling specific to the integration middleware component(s). This allows for more control on the underlying integration middleware at runtime with generated runtime metadata. The generation mechanism relies on pre-determined mechanism and intelligent defaulting to allow use of the integration middleware only in specific manner. This ensures better monitoring and operations via the business network management module without compromising capabilities of the integration middleware technology.

Figure 7:
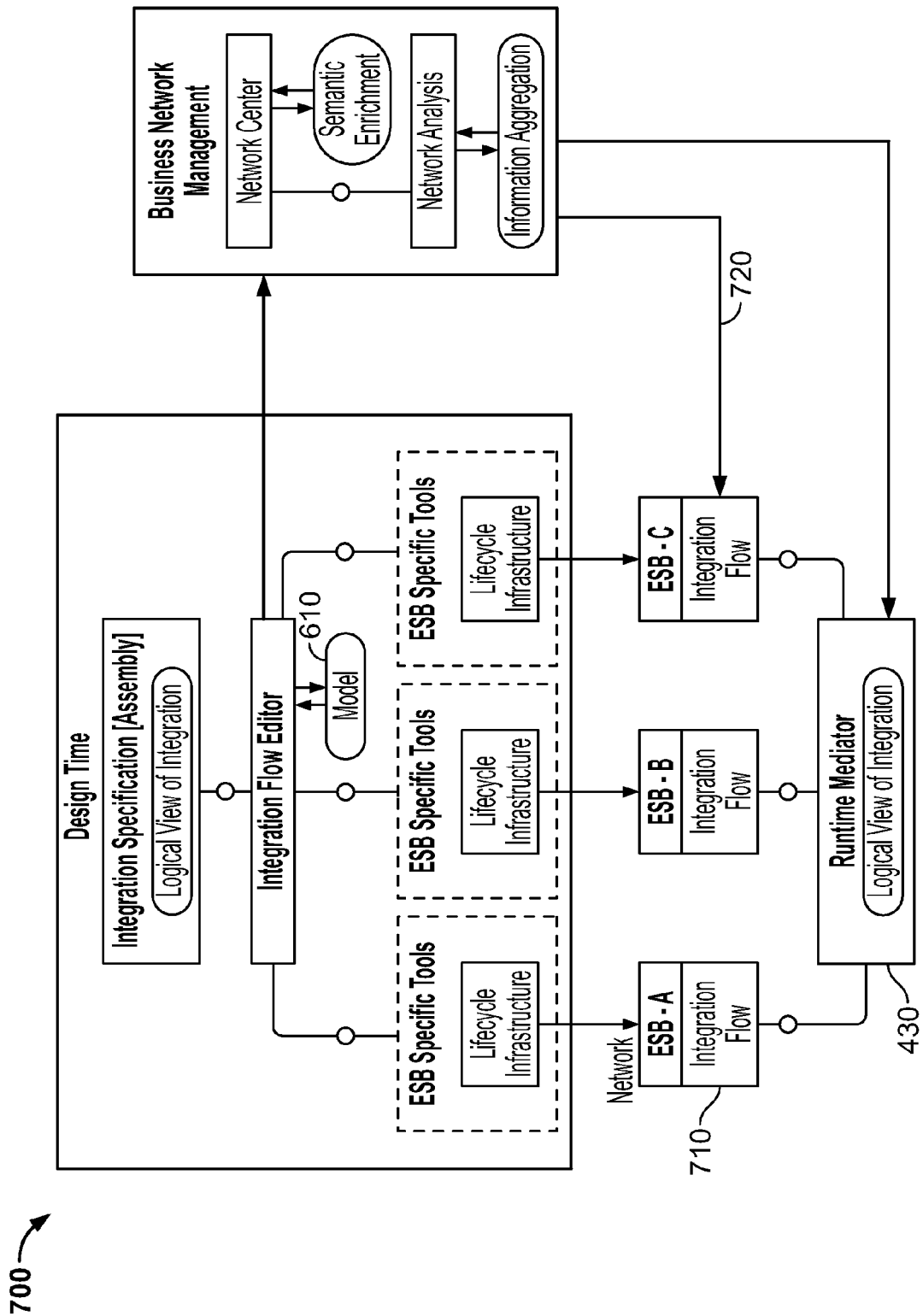
FIG. 7 is a block diagram showing an architecture for virtualization with runtime components and integration middleware.

Pattern 5 involves implementing integration content and integrating and interpreting on a runtime engine. FIG. 7 is a block diagram showing an architecture 700 for virtualization with runtime components 710 and integration middleware. This pattern represents a further level of virtualization by introducing the runtime components 710, each here labeled an "integration flow" container, that work within, or side-by-side with, the integration middleware. The runtime components 710 interpret the generic model 610, as indicated by an arrow 720, and feeds it into the specific integration middleware.

The runtime components 710 can use existing services, or capabilities and feature sets can be added on existing integration middleware components without migration to one unified technology. The same runtime is plugged into an integration middleware using native plug-in/add-on development. The results are: control of the underlying integration middleware and the integration executed on it; strong unification for functional and non-functional characteristics, allowing for better operations across multiple integration middleware components.

In some implementations, the runtime entity 106 (FIG. 1B) is initiated that retrieves an integration model from integration middleware in nodes of the business network 100. The runtime mediator 430 can be initiated that tracks message flows between nodes of the business network. The generic model 610 can be generated based on at least the retrieved integration model and the tracked message flows. Thereafter, when a flow interpreter such as one of the runtime components 710 is initiated, it interprets the generic model 610 and provides necessary input to the specific component(s) of the integration middleware. Accordingly, Patterns 4 and 5 are examples of one of the virtualization level options 118 (FIG. 1B), whether selected by a user or automatically, that involves virtualizing components in the business network 100.

In conclusion, for a particular integration middleware technology one or more patterns can be implemented. The choice of virtualization level options(s) in implementing the pattern (s) defines the degree to which a particular integration middleware participates, and is virtualized by, the business network management module 112 or the virtualization module 102 (FIG. 1B).

Figure 8:
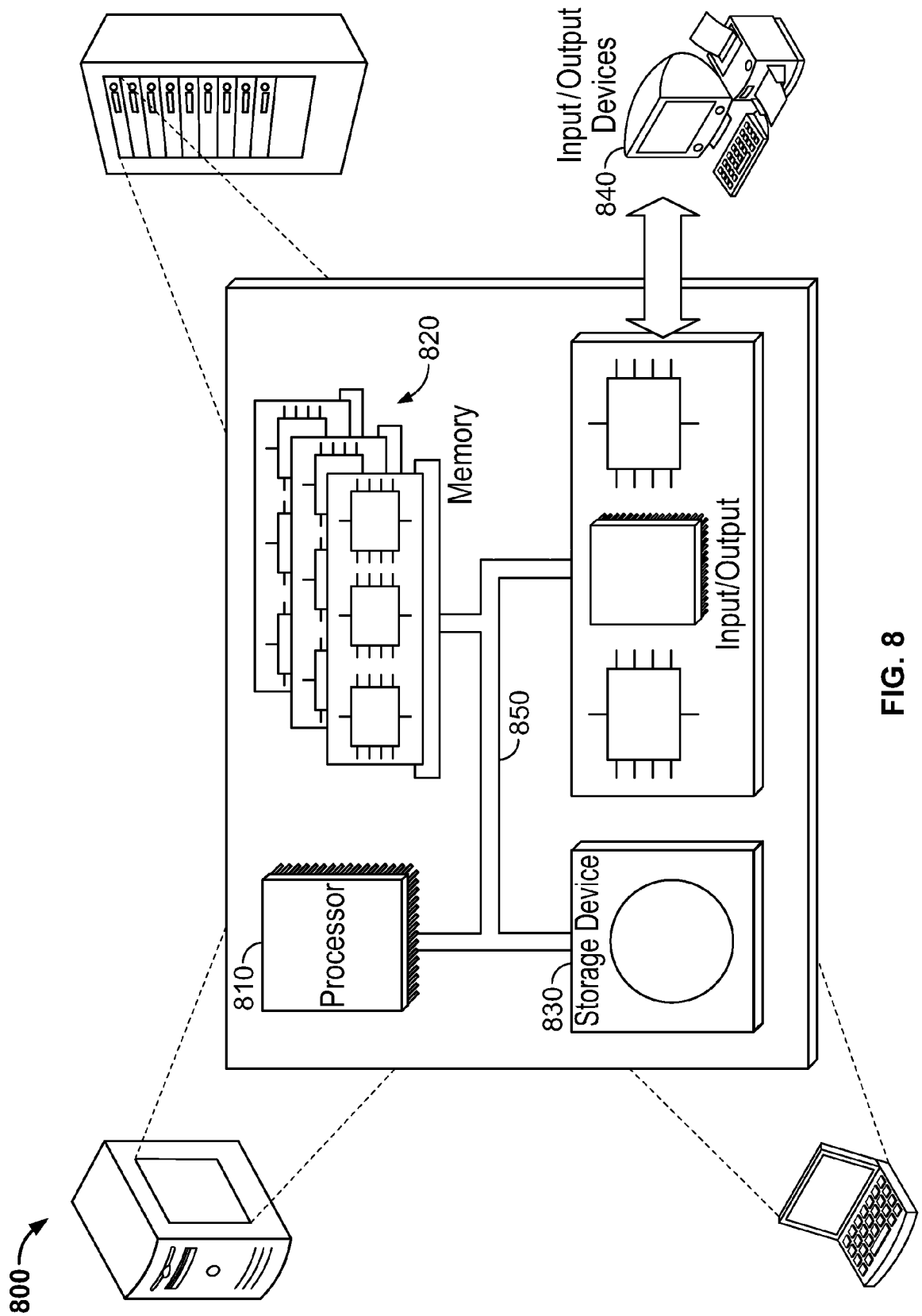
FIG. 8 is a block diagram of a computing system that can be used in connection with computer-implemented methods described in this document.

FIG. 8 is a schematic diagram of a generic computer system 800. The system 800 can be used for the operations described in association with any of the computer-implement methods described previously, according to one implementation. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In some implementations, the memory 820 is a computer-readable medium. The memory 820 is a volatile memory unit in some implementations and is a non-volatile memory unit in other implementations.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes an integration middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method comprising:
    selecting in a computer system at least one virtualization level option for a business network from among at least: a first virtualization level option that includes externalizing interaction logic in the business network, a second virtualization level option that includes virtualizing content in the business network, and a third virtualization level option that includes virtualizing components in the business network, wherein the business network comprises a plurality of network components and one or more middleware components, each of the plurality of network components being selected from the group consisting of: computing devices, processes, metadata, and configuration information, and wherein the one or more middleware components are configured to facilitate communication between the network components;
    performing the selected virtualization level option using the computer system, wherein performing the selected virtualization level option comprises:
        crawling the business network to identify the plurality of network components that are part of the business network, wherein the plurality of network components are discovered by the crawling based on one or more patterns that are associated with the selected virtualization level option,
        selecting a particular subset of the plurality of network components based on the selected virtualization level option, and
        generating a virtualization of the business network based on i) the middleware components, ii) the particular subset of the plurality of network components, and iii) the selected virtualization level option, wherein the generated virtualization provides a single view through which aspects of the subset of the plurality of network components can be accessed and controlled; and
    outputting, by the computer system, information associated with the virtualization generated from performing the selected virtualization level option.

2. The method of claim 1, wherein the first virtualization level option is selected, and wherein performing the first virtualization level option comprises:
    retrieving at least design time metadata, configuration metadata, runtime metadata and operation data for the one or more middleware components that include integration middleware in nodes of the business network; and
    generating a business network documentation based on at least retrieved metadata.

3. The method of claim 2, wherein at least business process models, solution blueprints, application metadata, and business data are also retrieved.

4. The method of claim 1, wherein the first virtualization level option is selected, and wherein performing the first virtualization level option comprises:
    initiating a runtime entity that retrieves specific integration models from respective ones of the one or more middleware components that include integration middlewares in nodes of the business network; and
    generating a business network documentation based on at least the retrieved integration models.

5. The method of claim 1, wherein the second virtualization level option is selected, and wherein performing the second virtualization level option comprises:
    initiating at least one runtime entity that retrieves specific integration models from respective ones of the one or more middleware components that include integration middlewares in nodes of the business network;
    receiving user input specifying business characteristics and technical characteristics of the business network; and
    generating an integration specification based on at least the retrieved integration models, the integration specification representing interaction across the specific integration models.

6. The method of claim 5, further comprising:
    initiating a runtime mediator that tracks message flows between nodes of the business network; and
    generating a business network documentation based on at least the retrieved specific integration models and the tracked message flows.

7. The method of claim 1, wherein the third virtualization level option is selected, and wherein performing the third virtualization level option comprises:
    initiating a runtime entity that retrieves a specific integration model from respective ones of the one or more middleware components that include integration middlewares in nodes of the business network;

initiating a runtime mediator that tracks message flows between nodes of the business network; and generating a generic model based on at least the retrieved integration model and the tracked message flows.

8. The method of claim 7, further comprising:

generating, using the generic model and for a specific component of the integration middleware, at least runtime metadata and configuration data; and providing the runtime metadata and the configuration data to the specific component of the integration middleware.

9. The method of claim 7, further comprising:

initiating a flow interpreter that interprets the generic model and provides necessary input to the specific component of the integration middleware.

10. The method of claim 1, further comprising:

displaying the virtualization level options to a user of the computer system; and receiving a user input indicating at least one of the displayed virtualization level options to be selected.

11. A computer program product embodied in a non-transitory computer readable storage device, the computer program product comprising instructions that when executed cause a processor to perform a method comprising:

displaying virtualization level options for a business network to a user, the virtualization level options including at least: a first virtualization level option that includes externalizing interaction logic in the business network, a second virtualization level option that includes virtualizing content in the business network, and a third virtualization level option that includes virtualizing components in the business network, wherein the business network comprises a plurality of network components and one or more middleware components, each of the plurality of network components being selected from the group consisting of: computing devices, processes, metadata, and configuration information, and wherein the one or more middleware components are configured to facilitate communication between the network components;

receiving a selection by the user of at least one of the virtualization level options; and performing a virtualization process in the business network according to the selected virtualization level option, wherein performing the virtualization process comprises:

crawling the business network to identify the plurality of network components that are part of the business network, wherein the plurality of network components are discovered by the crawling based on one or more patterns that are associated with the selected virtualization level option, selecting a particular subset of the plurality of network components based on the selected virtualization level option, and generating a virtualization of the business network based on i) the middleware components, ii) the particular subset of the plurality of network components, and iii) the selected virtualization level option, wherein the generated virtualization provides a single view through which aspects of the subset of the plurality of network components can be accessed and controlled.

12. A system comprising:

computer devices connected with each other to form a business network;

a virtualization module tangibly embodied in a computer readable storage device, the virtualization module configured to display virtualization level options for the business network to a user, the virtualization level options including at least: a first virtualization level option that includes externalizing interaction logic in the business network, a second virtualization level option that includes virtualizing content in the business network, and a third virtualization level option that includes virtualizing components in the business network, wherein the business network comprises a plurality of network components and one or more middleware components, each of the plurality of network components being selected from the group consisting of: computing devices, processes, metadata, and configuration information, wherein the one or more middleware components are configured to facilitate communication between the network components and wherein the virtualization module further comprises:

a user interface through which a particular one of the virtualization level options is selected; and a virtualization generator that is configured to generate a virtualization of the business network based on i) the middleware components, ii) a particular subset of the plurality of network components that is selected based on the selected virtualization level option, and iii) the selected virtualization level option, wherein the generated virtualization provides a single view through which aspects of the subset of the plurality of network components can be accessed and controlled, wherein the plurality of network components are discovered by the virtualization generator based on one or more patterns that are associated with the selected virtualization level option.

13. The system of claim 12, wherein at least part of the virtualization module is implemented as a cloud service for the business network.

14. The system of claim 12, further comprising:

a runtime entity that after the user selects the second virtualization level option retrieves specific integration models from the one or more middleware components that include integration middlewares in at least some of the computer devices;

an input control for a user specify business characteristics and technical characteristics of the business network; and an integration specification that the virtualization module generates based on at least the retrieved integration models, the integration specification representing interaction across the specific integration models.

15. The system of claim 14, wherein at least the integration specification is generated as a cloud service for the business network.

16. The system of claim 14, further comprising:

a runtime mediator that tracks message flows between at least some of the computer devices; and a business network documentation that the virtualization module generates based on at least the retrieved integration models and the tracked message flows.

17. The system of claim 12, wherein the user selects the third virtualization level option, the system further comprising:

a runtime entity that after the user selects the second virtualization level option retrieves an integration model from the one or more middleware components that include integration middleware in at least some of the computer devices;

a runtime mediator that tracks message flows between at least some of the computer devices; and a generic model that the virtualization module generates based on at least the retrieved integration model and the tracked message flows.

18. The system of claim 17, wherein at least the generic model is generated as a cloud service for the business network.

19. The system of claim 17, further comprising:

runtime metadata and configuration data that the virtualization module generates for a specific component of the integration middleware using the generic model, and provides to the specific component of the integration middleware.

20. The system of claim 17, further comprising:

a flow interpreter that interprets the generic model and provides necessary input to the specific component of the integration middleware.

21. The computer-implemented method of claim 1, wherein the crawling obtains details about the plurality of network components at one or more levels of detail, the one or more levels of detail being selected based on the one or more patterns associated with the selected visualization option; and generating the virtualization of the business network is further based on the details that are obtained at the one or more levels of detail.

* * * * *